Patented Apr. 10, 1934

1,954,596

UNITED STATES PATENT OFFICE 1,954,596

MATERIAL FOR HIGH EMISSION CATHODES

Bernhard Loewe, Berlin, Germany

No Drawing. Application April 5, 1929, Serial No. 352,919. In Germany April 5, 1928

8 Claims. (Cl. 23—186)

In the manufacture of high emission cathodes with oxide coated filament or coating with highly emissive material the difficulty arises of protecting the compounds which, as a rule, are not constant at the air, against the influence of noxious gases during the process of manufacture. It is, for instance, difficult to prepare a filament coated with alkaline earth oxides because within a short time the air will convert the oxide into carbonates in which case the adherence and emissivity of the material will be destroyed. This difficulty commences already during the preparation of the oxide and hydroxides respectively.

It has, however, been discovered that the said difficulties may be easily overcome if the materials used are produced under a protecting medium and if the protective coating is left upon them until final setting into operation of the valve. Thus completely pure barium hydroxide may in the usual manner be crystallized out of a hot saturated solution of barium hydroxide which for the purpose of removing any barium carbonate existing therein, has previously been filtered. This material is thereafter introduced into fusible hydrocarbons and heated in a melted mass, for instance of paraffin, which by itself is not capable of reaction, when you will easily succeed in removing the water of crystallization and in further agglomeration this mass to a crystal lump. In order to hasten the drainage the process may also be carried out in the vacuum or under overpressure. Since the barium hydroxide thus drained lies as a crystal at the bottom of the vessel, it may easily be separated from the paraffin above it. The thin layer of paraffin which remains on the crystal lump, on the other hand, protects the same against damages from the atmosphere. This material may now be crushed in turn and spread on the incandescent filament, if necessary with the addition, once more, of paraffin. If it is desired to mix the barium hydroxide with the other reaction compounds in order to set elementary barium free within the vacuum valve, the barium hydroxide which has been melted under paraffin and drained, may, for instance, be thoroughly mixed and ground with the material in question in a ball mill heated to the suitable temperature, and the reaction mixture may be further used, if necessary, after decantation of the excess paraffin. The adhesive layer of paraffin protects in every instance the material against the influence of the air. It may easily be compressed to tablets and be further worked up in that shape (for instance according to my patent application Serial No. 342,930).

Instead of the process described for barium some other alkaline earth metal or alkali metal may be used, further cerium, lanthanum and all other highly emissive substances. In like manner oxides, nitrates etc. may be used in place of the hydroxide combination described. You may likewise and with equal success use other hydrocarbons and mobile fusions of metals or coats of lacquer instead of paraffin.

I claim:

1. A process for manufacturing a material for high emission cathodes comprising the steps of introducing an alkali earth hydroxide into a melted mass of paraffin and heating both materials to a higher temperature for freeing the hydroxide of water, the paraffin simultaneously serving as a protective means against changes by the air.

2. A process for manufacturing a material for high emission cathodes comprising the steps of introducing barium hydroxide into a melted mass of paraffin and heating both materials to a higher temperature for freeing the hydroxide of water, the paraffin simultaneously serving as a protective means against changes by the air.

3. A process for manufacturing a material for high emission cathodes comprising the steps of introducing an alkali earth hydroxide into a melted mass of paraffin and heating both materials to a higher temperature under underpressure for freeing the hydroxide of water, the paraffin simultaneously serving as a protective means against changes by the air.

4. A process for manufacturing a material for high emission cathodes comprising the steps of introducing barium hydroxide into a melted mass of paraffin and heating both materials to a higher temperature under underpressure for freeing the hydroxide of water, the paraffin simultaneously serving as a protective means against changes by the air.

5. A process for manufacturing a material for high emission cathodes comprising the steps of filtering barium hydroxide for the purpose of removing any barium carbonate existing therein, introducing this material into a melted mass of paraffin and heating both materials to a higher temperature for freeing the hydroxide of water, the paraffin simultaneously serving as a protective means against changes by the air.

6. A process for manufacturing a material for high emission cathodes comprising the steps of filtering barium hydroxide for the purpose of removing any barium carbonate existing therein, introducing this material into a melted mass of paraffin and heating both materials to a higher temperature under underpressure for freeing the hydroxide of water, the paraffin simultaneously serving as a protective means against changes by the air.

7. As a new product of manufacture an alkali earth hydroxide mass free from crystal water, moisture and carbonate and containing throughout a small addition of paraffin.

8. As a new product of manufacture a barium hydroxide mass free from crystal water, moisture and barium carbonate and containing throughout a small addition of paraffin.

BERNHARD LOEWE.